United States Patent
Chrestman

(10) Patent No.: US 6,505,435 B2
(45) Date of Patent: Jan. 14, 2003

(54) INSECT TRAP

(76) Inventor: Gerald W. Chrestman, Box 35, Waterford, MS (US) 38685

( * ) Notice: Subject to any disclaimer, the term of this patent is extended or adjusted under 35 U.S.C. 154(b) by 0 days.

(21) Appl. No.: 09/803,805

(22) Filed: Mar. 12, 2001

(65) Prior Publication Data

US 2002/0157301 A1 Oct. 31, 2002

(51) Int. Cl.$^7$ ............................................... A01M 1/02
(52) U.S. Cl. .......................................................... 43/122
(58) Field of Search ................................... 43/107, 122

(56) References Cited

U.S. PATENT DOCUMENTS

| | | | | |
|---|---|---|---|---|
| 1,085,388 A | * | 1/1914 | Overmyer | 43/122 |
| 1,611,515 A | | 12/1926 | Crown | |
| 1,786,704 A | * | 12/1930 | Deibele | 43/122 |
| 1,858,087 A | * | 5/1932 | Howard | 43/122 |
| 1,924,379 A | * | 8/1933 | Reese | 43/122 |
| 2,014,500 A | * | 9/1935 | Lass | 43/122 |
| 4,244,135 A | * | 1/1981 | Harwoods | 43/122 |
| 4,551,941 A | * | 11/1985 | Schneidmiller | 43/107 |
| 5,231,792 A | | 8/1993 | Warner | |
| 5,243,781 A | * | 9/1993 | Carter | 43/122 |
| 5,392,560 A | | 2/1995 | Donahue et al. | |
| 5,461,822 A | * | 10/1995 | Green et al. | 43/122 |
| 5,557,880 A | | 9/1996 | Schneidmiller | |
| 5,596,833 A | * | 1/1997 | Harrie et al. | 43/122 |
| 5,987,809 A | | 11/1999 | Cheok | |
| 6,112,454 A | * | 9/2000 | Plato et al. | 43/121 |

FOREIGN PATENT DOCUMENTS

| | | | | |
|---|---|---|---|---|
| GB | 2 258 130 A | * | 2/1993 | 43/122 |
| IT | 259371 | * | 6/1928 | 43/122 |

* cited by examiner

*Primary Examiner*—Kurt Rowan
(74) *Attorney, Agent, or Firm*—Woodard, Emhardt, Naughton Moriarty & McNett LLP

(57) ABSTRACT

A yellow jacket and fly trap. The main body of the trap is produced from a screen and has a narrowing inlet passage with a passage defining an oblong inlet from the passage into a holding chamber. A bait receptacle is removably mounted within the passage.

8 Claims, 3 Drawing Sheets

INSECT TRAP

BACKGROUND OF THE INVENTION

1. Field of the Invention

This invention is in the field of traps for catching insects and particularly, flies and yellow jackets.

2. Description of the Prior Art

Numerous traps have been devised for catching insects including flies and yellow jackets. Specifically, the prior devices include a one-way entrance passage leading into a holding chamber with the inlet side sufficiently smaller than the width of the chamber to limit the insect from escaping. A representative sample of insect traps are shown in the following U.S. Pat. Nos.:

| | | |
|---|---|---|
| 1,611,515 | G.S. Crown | Dec. 21, 1926 |
| 4,551,941 | Schneidmiller | Nov. 12, 1985 |
| 5,231,792 | Warner | Aug. 3, 1993 |
| 5,243,781 | Carter | Sept. 14, 1993 |
| 5,392,560 | Donahue et al. | Feb. 28, 1995 |
| 5,557,880 | Schneidmiller | Sept. 24, 1996 |
| 5,987,809 | Cheok | Nov. 23, 1999 |

I have invented an improved insect trap by designing the entrance passage and bait receptacle in such a way that the insect is attracted from the receptacle through the passage and then into the chamber. Further, the entrance passage is spaced apart from the interior side wall defining the chamber to increase the difficulty of the insect crawling and escaping from the chamber.

Improved results have been obtained by configuring the inlet leading into the chamber while producing the chamber walls from screen to allow the ambient light to flood the chamber and the oblong slit. The bait receptacle is positioned in the passage with the light passing through the slit attracting the insect further in the passage and into the chamber. The bait receptacle is located externally of the insect holding chamber allowing the insect to be attracted to the bait prior to entering the holding chamber. Excellent results have been obtained in trapping flies and yellow jackets due to the oblong inlet coupled with the location of the bait receptacle relative to the holding chamber.

SUMMARY OF THE INVENTION

One embodiment of the present invention is trap for insects comprising a main body forming a hollow interior to hold insects. The main body including a bottom wall with an opening extending therethrough and further including an entrance wall with a top end. The entrance wall is continuous surrounding the opening of the bottom wall and extending upwardly therefrom to the top end forming an upwardly extending passage. The entrance wall at the top end has a non-circular, oblong slit forming an inlet into the main body to attract insects to move from the passage into the hollow interior. An insect bait receptacle is located within the passage beneath said inlet but outside of said hollow interior to attract insects into the passage.

It is an object of the present invention to provide a new and improved insect trap.

A further object of the present invention is to provide a fly and yellow jacket trap with an entrance passage and bait receptacle configured and located to attract the fly and/or yellow jacket into the holding chamber.

Related objects and advantages of the present invention will be apparent by the following description.

DESCRIPTION OF THE PREFERRED EMBODIMENT

Figure 1:
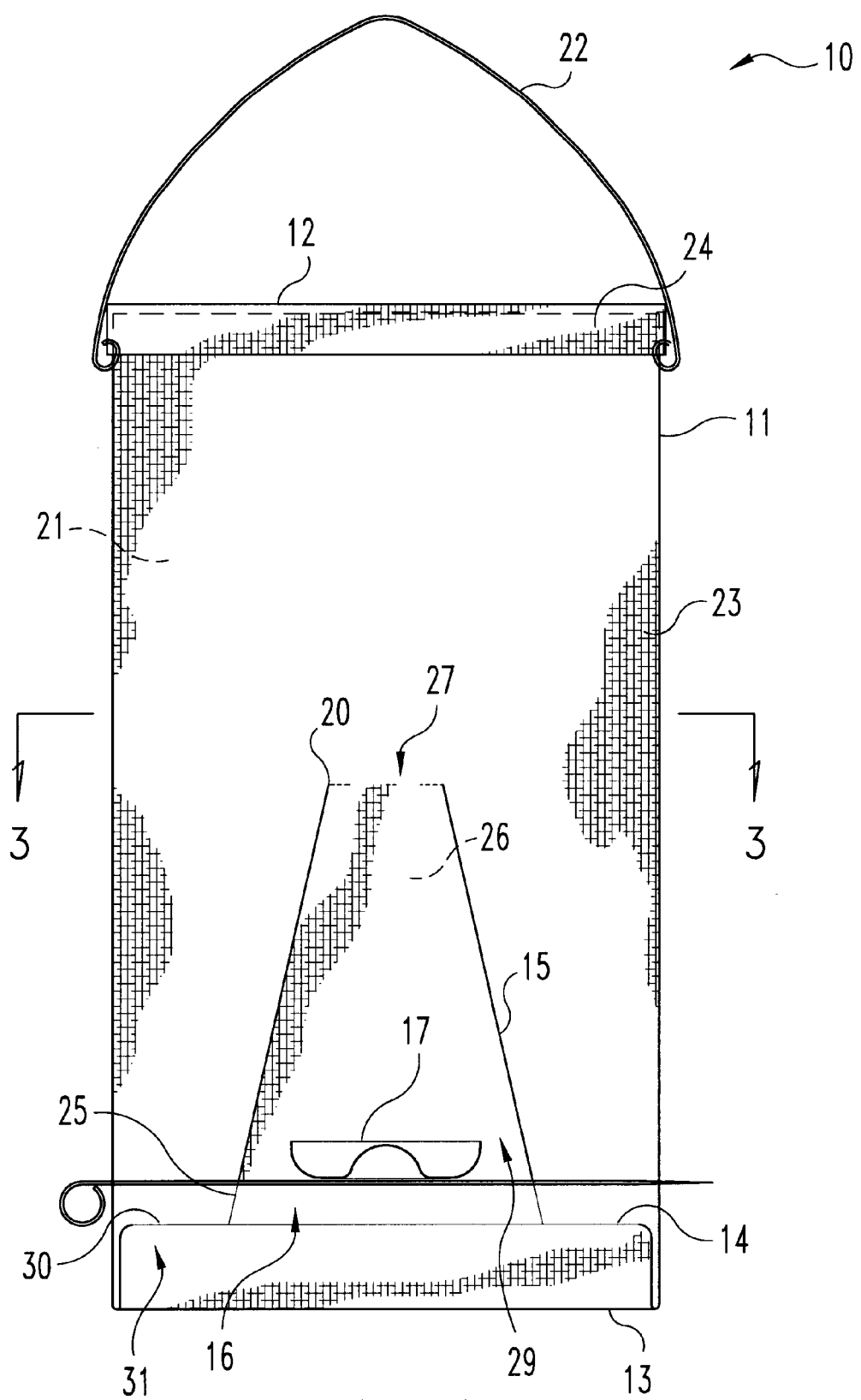
FIG. 1 is a side view of an insect trap incorporating my present invention.
Figure 2:
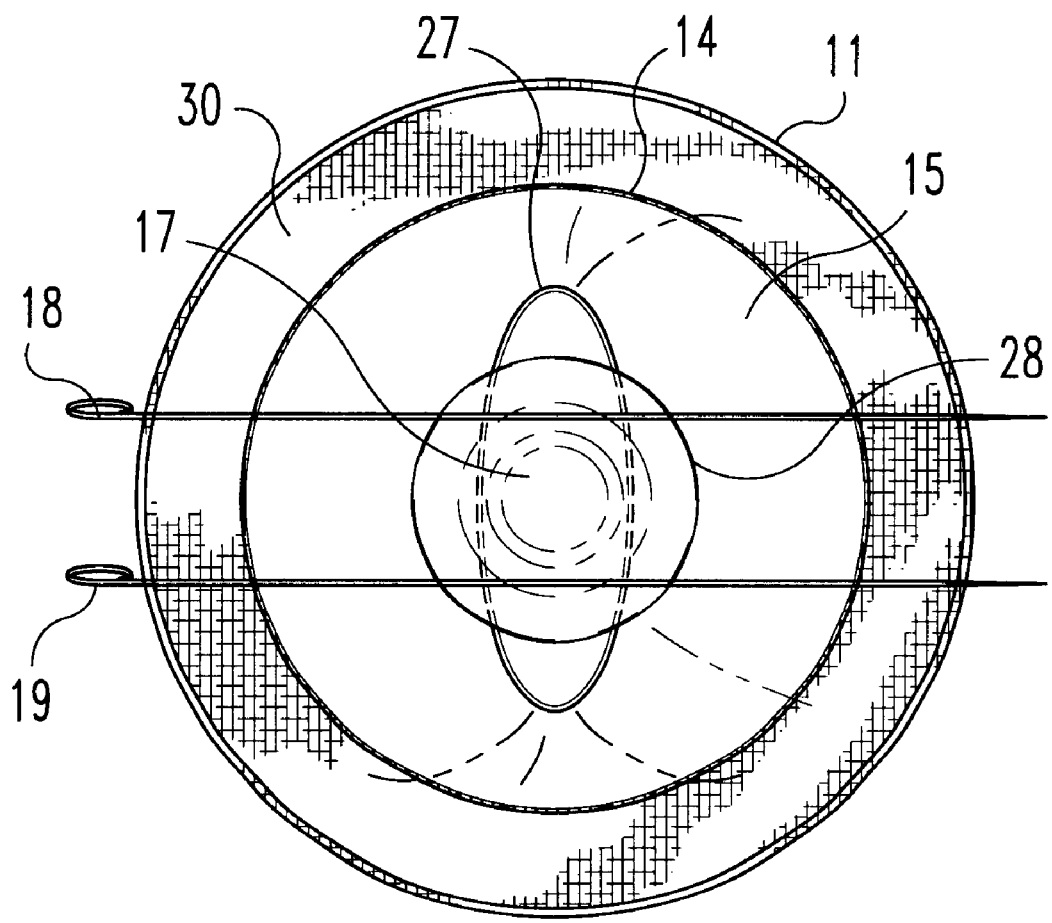
FIG. 2 is a bottom view.
Figure 3:
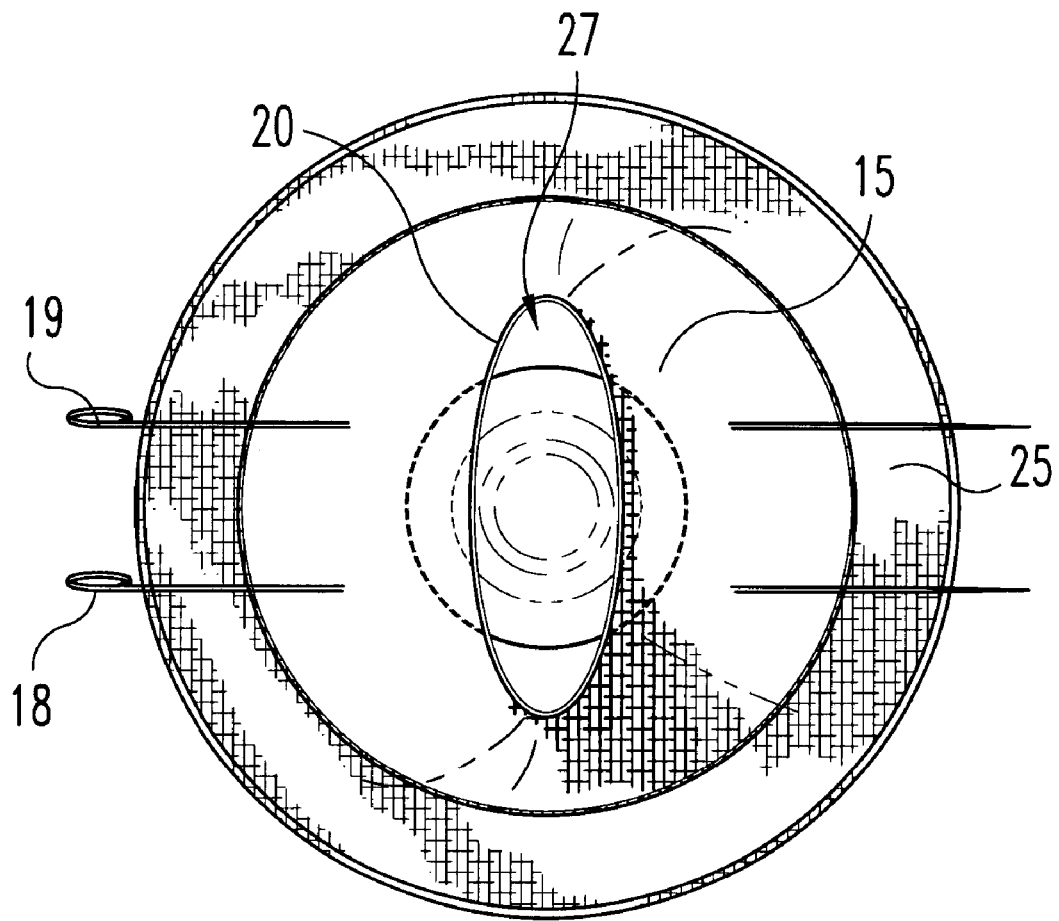
FIG. 3 is a cross-sectional view taken along the line 3—3 of FIG. 1 and viewed in the direction of the arrows.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now more particularly to the drawings, there is shown a trap 10 for insects, and specifically, to trap and hold flies and yellow jackets. Trap 10 includes a cylindrical main body 11 formed by a cylindrical side wall 23 having a top end 12 and a bottom end 13. A bottom wall 14 is connected to and extends across main body 11 and is positioned upwardly from bottom end 13. An interior side wall 15 extends upwardly from bottom wall 14 into the main body 11 of the trap with wall 15 defining an opening 16 extending through bottom wall 14. An insect bait receptacle 17 is located within the passage formed by interior side wall 15 and is removably held in place within the passage by a pair of rods 18 and 19. The top end 20 of wall 15 is provided with an inlet 27 leading into the hollow interior 21 formed by side wall 23. A wire holder 22 is fastened to main body 11 to suspend the trap above the ground.

A screen forms side wall 23 and defines the holding chamber 21. Likewise, the top wall 24 is produced from screen material and may be removably attached to side wall 23 by conventional wire fastening devices to allow the wall to be removed and the trap emptied of insects. It is not, however, necessary that wall 24 be removable with the insects simply remaining in the trap. Top wall 24 is positioned atop side wall 23 and encloses the top end 12 of chamber 21.

The bottom wall 14 is produced from screen material and is mounted and connected to side wall 23 enclosing the bottom end 13 of chamber 21. Wall 14 is located upwardly from the bottom end 13 of side wall 23 forming a recess 31. Wall 14 includes an opening 16 with the interior wall 15 extending continuously around opening 16 and upwardly into the chamber towards the top end of the trap. The interior wall or entrance wall 15 has a truncated, semi-conical configuration. That is, the bottom end 25 of wall 15 extends continuously along and surrounds the opening 16 with the top 20 of wall 15 extending around and tracing an oblong slit or inlet 27. Wall 15 is produced from screen material thereby allowing light to pass into the interior of passage 26 formed by wall 15.

The slit or inlet 27 is sized smaller than opening 16 with wall 15 converging from the bottom 25 to the top 20 of wall 15 thereby defining a narrowing passage 26 as the insect flies upwardly from receptacle 17 toward slit 27. The ambient light surrounding the trap passes through the screen walls 23 and 24 with light therefore being visible from within passage 26 through inlet 27 attracting the insect from the receptacle 17 upwardly further into passage 26 and through inlet 27 into the interior 21 which forms a holding chamber. By producing walls 23, 24 and 15 from screen, a plurality of apertures are provided extending through the walls through which the ambient light is visible from within passage 26. Recess 31 is positioned beneath opening 16 and is larger in size than the opening to thereby allow the insect to fly more readily into passage 26.

An insect bait receptacle 17, such as a tray or plate, is located within passage 26 and has a continuous extending edge 28 spaced apart and located inwardly from interior wall 15 forming a gap 29. Thus, the insect may fly through opening 16 and through gap 29 to the bait atop receptacle 17. Best results have been obtained by locating receptacle 17 several inches, for example, 2 inches, above the bottom screen wall 14 requiring the insect to fly into recess 31 and then up into passage 26 to receptacle 17. Notably, receptacle 17, while located within passage 26, is not physically located within the interior 21 of the main body 11. Rods 18 and 19 extend through side wall 23 and the interior side wall 15 forming a holding plane upon which receptacle 17 removably rests. The rods may be moved in a sliding motion outwardly from the trap facilitating the removal of the bait receptacle so that fresh bait, such as, hamburger, spoiled meat, etc. may be positioned. The addition of blood on the bait will add as a further attraction.

In order to limit the escape of the insect from the trap, I have located the bottom 25 of side wall 15 inwardly from side wall 23 so that the bottom wall 14 forms a horizontal wall portion 30 between side wall 23 and wall 15 requiring the insect to traverse wall portion 30 as the insect crawls from side wall 23 to the interior side wall 15. That is, one additional wall is provided for a crawling insect that is attempting to crawl up wall 15 to the inlet. Further, the interior screen wall 15 extends into chamber 21 approximately one-third the distance from the top 12 to the bottom 13, thereby adding to the difficulty and length of walls upon which the insect must traverse. Interior wall 15 is spaced from side wall 23 at bottom 25 at least one-and-a-half inches.

Best results have been obtained by hanging the trap three to four feet above the ground. Wire holder 22 may extend through side wall 23 and top wall 24 to suspend the trap. The trap is designed to entice the insect into the holding chamber. More specifically, recess 31 provides a pre-entrance entry into passage 26 allowing for the narrowing of the overall entrance into the trap. The bait is located upwardly from the bottom of the trap and into the entrance passage requiring the insect to actually fly into the entrance passage to obtain the bait. Further, the ambient light passing through the top wall 24 and side wall 23 of the trap floods passage 26 and illuminates inlet 27 attracting the insect not only to the bait, but then upwardly further into the passage and through inlet 27 to the holding chamber. Since wall 15 is of screen material, the amount of light observable through the wall is less than the amount of light observable through inlet 27. As a result, inlet 27 has a higher light intensity attracting the insect thereto. Once inside the chamber, the length of wall 15 extending into the chamber coupled with the bottom spacing of wall 15 from side wall 23 increases the difficulty of a crawling insect from escaping from the trap.

The prior art devices disclosed in the aforementioned listed patents, typically include rectangular or square trap inlets. I have achieved superior results by using an oblong inlet 27 or a non-circular inlet configured as a slit. Likewise, the elongated slit inlet provides superior insect retention as compared to a round throat with a round or rectangular inlet. Likewise, by locating the bait externally of the holding chamber, the insect is not required to fly into the holding chamber in order to obtain the bait, but is instead attracted into the holding chamber once the insect is at the location of the bait by the illuminated slit inlet 27.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A trap for insects comprising:
   a main body forming a hollow interior to hold insects, said main body including a bottom wall with an opening extending therethrough, said main body further includes an entrance wall with a top end, said entrance wall is continuous surrounding said opening of said bottom wall and extending upwardly therefrom to said top end forming an upwardly extending passage, said entrance wall at said top end having a non-circular, oblong slit forming an inlet into said main body to allow insects to move from said passage into said hollow interior;
   an insect bait receptacle located within said passage beneath said inlet but outside of said hollow interior to attract insects into said passage; and,
   a holder secured to said main body to hold said insect bait receptacle within said passage and, wherein:
   said main body includes a side wall and a top wall connected together with said top wall extending across said side wall enclosing said interior with said side wall and said top wall including a plurality of apertures that extend therethrough allowing ambient light to be visible from within said passage and through said oblong slit to attract an insect through said slit toward the ambient light;
   said entrance wall is connected to said bottom wall and spaced apart from said side wall, said bottom wall between said side wall and said entrance wall limiting insect crawling from said side wall directly onto said entrance wall; and,
   said holder includes a plurality of rods removably extending through said side wall and said entrance wall forming a holding plane upon which said insect bait receptacle removably rests.

2. The trap of claim 1 wherein:
   said inlet is inlet sized smaller than said opening.

3. The trap of claim 2 wherein:
   said receptacle is spaced apart from said entrance wall.

4. The trap of claim 3 wherein:
   said side wall extends beneath said bottom wall defining a pre-entrance recess in said main body sized larger than and leading to said passage.

5. The trap of claim 4 wherein:
   said top wall is removable from said side wall to allow cleaning of the trap.

6. A yellow jacket trap comprising:
   a cylindrical screen forming a side wall and defining a holding chamber for yellow jackets, said chamber including a top end and a bottom end;
   a top screen wall connected to and positioned atop said side wall enclosing said top end of said chamber;

a bottom screen wall connected to said side wall enclosing said bottom end of said chamber, said bottom screen wall including an opening extending therethrough;

an interior screen wall connected to said bottom screen wall and extending continuously around said opening and upwardly into said chamber toward said top end forming a passage, said interior screen wall having a top portion with a non-circular, oblong slit thereat allowing insects within said passage to move into said chamber;

an insect bait receptacle located within said passage but outside of said chamber; and, a rod device removably extending through said side wall and across said passage holding said receptacle therein.

7. A yellow jacket trap comprising:

a cylindrical screen forming a side wall and defining a holding chamber for yellow jackets, said chamber including a top end and a bottom end;

a top screen wall connected to and positioned atop said side wall enclosing said top end of said chamber;

a bottom screen wall connected to said side wall enclosing said bottom end of said chamber, said bottom screen wall including an opening extending therethrough;

an interior screen wall connected to said bottom screen wall and extending continuously around said opening and upwardly into said chamber toward said top end forming a passage, said interior screen wall having a top portion with a slit thereat allowing insects within said passage to move into said chamber;

an insect bait receptacle located within said passage but outside of said chamber; and, a pair of rods removably extending through said side wall, said interior screen wall and across said passage holding said receptacle therein.

8. The yellow jacket trap of claim 7 and further comprising:

a hanger mounted thereto for suspending the trap above ground.

* * * * *